(12) United States Patent
Ericksen et al.

(10) Patent No.: US 11,026,087 B2
(45) Date of Patent: Jun. 1, 2021

(54) SYSTEMS AND METHODS FOR PROVISIONING USER DEVICES USING A ZERO TOUCH CONFIGURATION PROXY

(71) Applicant: Charter Communications Operating, LLC, St. Louis, MO (US)

(72) Inventors: Peter Andrew Ericksen, Castle Rock, CO (US); Ali Soltani, Lutz, FL (US)

(73) Assignee: Charter Communications Operating, LLC, St. Louis, MO (US)

( * ) Notice: Subject to any disclaimer, the term of this patent is extended or adjusted under 35 U.S.C. 154(b) by 158 days.

(21) Appl. No.: 16/398,000

(22) Filed: Apr. 29, 2019

(65) Prior Publication Data

US 2020/0344607 A1    Oct. 29, 2020

(51) Int. Cl.
  *H04W 12/069*    (2021.01)
  *H04L 9/32*    (2006.01)

(52) U.S. Cl.
  CPC ......... *H04W 12/069* (2021.01); *H04L 9/3263* (2013.01)

(58) Field of Classification Search
  None
  See application file for complete search history.

(56) References Cited

U.S. PATENT DOCUMENTS

| | | |
|---|---|---|
| 2006/0268829 A1 | 11/2006 | Nedeltchev |
| 2007/0211700 A1 | 9/2007 | Hsieh et al. |
| 2007/0217434 A1 | 9/2007 | Welbourn |
| 2014/0079202 A1 | 3/2014 | Movshovich et al. |
| 2017/0006034 A1* | 1/2017 | Link, II ............. H04L 63/0272 |
| 2017/0185393 A1* | 6/2017 | Sankaranarayanan .... G06F 8/61 |

FOREIGN PATENT DOCUMENTS

GB    2507256 A    4/2014

* cited by examiner

*Primary Examiner* — Brandon S Hoffman
(74) *Attorney, Agent, or Firm* — The Marbury Law Group, PLLC (57) ABSTRACT

Systems, methods, and devices for provisioning user equipment devices. A zero touch configuration proxy (ZTCP) component may be configured to receive a client certificate and a request for a configuration file from a UE device, verify the authenticity of the received client certificate, use PKI and the SSL_CLIENT_S_DN_CN field of the client certificate to identify the UE, issue various commands/API calls to a provisioning system, determine whether the specific UE device is currently authorized to receive a particular service (e.g., VoIP, etc.), determine whether the specific UE device is allowed to access the requested configuration file, and send the configuration file to the UE device in response to determining, based on SSL_CLIENT_S_DN_CN field in the client certificate, that the UE device is authorized to access the configuration file and receive the requested service.

40 Claims, 5 Drawing Sheets

SYSTEMS AND METHODS FOR PROVISIONING USER DEVICES USING A ZERO TOUCH CONFIGURATION PROXY

BACKGROUND

Generally, user equipment (UE) devices and network equipment must be provisioned before a subscriber may begin utilizing VoIP and other services provided by an operator or service provider network. Provisioning may include configuring various hardware and software systems to establish connectivity and services on the UE for the first time. For example, hosted applications in the operator's network are provisioned to recognize authorized UE devices and deliver services in a manner that is compatible with the access rights and capabilities of each authorized UE device. Similarly, the UE is configured to point to the service provider, to bind to the correct line and the service profile, and to enable a set of local features that interact properly with the services being delivered in the service provider network.

Thus, provisioning is an important and necessary part of integrating a UE at the customer premises with the hosted services in the service provider network. Yet, due to growth in the popularity and usage of UE devices, increased service offerings and equipment options, security concerns and other factors, conventional solutions and processes for provisioning devices have become exceedingly time consuming, tedious and labor intensive, and can lead to significant costs for the equipment manufacturer or service provider. Accordingly, new and improved provisioning solutions will be beneficial to service providers, equipment manufacturers, and the consumers of their products and services.

SUMMARY

The various embodiments disclosed herein include methods of provisioning user equipment (UE) devices, which may include receiving, by a processor of a computing system that implements a zero touch configuration proxy (ZTCP), a service request and a client certificate that includes information in a SSL_CLIENT_S_DN_CN field from a UE device; determining, based on the information in the SSL_CLIENT_S_DN_CN field in the client certificate, whether the UE device is authorized to access a configuration file and receive a service requested in the service request; and sending the configuration file to the UE device in response to determining, based on the information contained in the SSL_CLIENT_S_DN_CN field in the client certificate, that the UE device is authorized to access the configuration file and receive the service requested in the service request.

In an embodiment, determining, based on the information in the SSL_CLIENT_S_DN_CN field in the client certificate, whether the UE device is authorized to access the configuration file and receive the service requested in the service request may include determining whether the UE device is authorized to receive a voice over internet protocol service. In a further embodiment, determining, based on the information in the SSL_CLIENT_S_DN_CN field in the client certificate, whether the UE device is authorized to access the configuration file and receive the service requested in the service request may include using a public key infrastructure (PKI) and the information contained in the SSL_CLIENT_S_DN_CN field in the client certificate to identify the UE device; and communicating with a provisioning server to determine whether the UE device is currently authorized to access the configuration file and receive the service requested in the service request.

In a further embodiment, the method may include establishing a transport layer security connection with the UE device by sending a server certificate to the UE device; verifying an authenticity of the client certificate; and determining whether that the UE device belongs to a group of approved devices that are each authorized to connect to a service provider network and communicate with the computing system. In a further embodiment, receiving the service request and the client certificate that includes the information in the SSL_CLIENT_S_DN_CN field may include receiving a signed client certificate that is signed by a root certificate authority component associated with a manufacturer of the UE device. In a further embodiment, receiving the service request and the client certificate that includes the information in the SSL_CLIENT_S_DN_CN field may include receiving an HTTP GET message that includes the client certificate and a $file variable.

In a further embodiment, determining, based on the information in the SSL_CLIENT_S_DN_CN field in the client certificate, whether the UE device is authorized to access the configuration file and receive the service requested in the service request may include verifying an authenticity of the client certificate; verifying that the UE device belongs to a group of approved devices that are authorized to connect to an associated service provider network; sending an System Access Device Get All Request command/call to extended services platform (XSP) component in response to verifying the authenticity of the client certificate and verifying that the UE device belongs to the group of approved devices; receiving an System Access Device Get All Response from the XSP; parsing the System Access Device Get All Response for variables $spid, $gid, $device and $deviceType; sending an System Access Device File Get List Request command to the XSP in response to receiving and parsing the System Access Device Get All Response; receiving an System Access Device File Get List Response message from the XSP in response to sending the System Access Device File Get List Request command to the XSP, the System Access Device File Get List Response message including a list of configuration files the UE device is allowed to access; and determining whether the $file variable is included in the list of configuration files.

In a further embodiment, the method may include sending an HTTPS GET $Repository_URL message to a provisioning server; receiving HTTPS XML file that includes a content of the configuration file associated with the $file variable; and sending the HTTPS XML file to the UE device in response to determining that the $file variable is included in the list of configuration files. In a further embodiment, the method may include sending an SIP Device Type File Get List Request to a provisioning server; receiving an SIP Device Type File Get List Response from the provisioning server; and determining whether the $file variable is included in the SIP Device Type File Get List Response in response to determining that the $file variable is not included in the list of configuration files.

In a further embodiment, the method may include sending an HTTPS GET $Repository_URL message to the provisioning server; receiving an HTTPS XML file that includes a content of the configuration file associated with the $file variable; sending the HTTPS XML file to the UE device in response to determining that the $file variable is included in the SIP Device Type File Get List Response; and sending an HTTPS ERROR message to the UE device in response to determining that the $file variable is not included in the SIP Device Type File Get List Response.

Further embodiments may include a server computing device that includes a server processor configured with server-executable instructions to receive a service request and a client certificate that includes information in a SSL_CLIENT_S_DN_CN field from a user equipment (UE) device; determine, based on the information in the SSL_CLIENT_S_DN_CN field in the client certificate, whether the UE device is authorized to access a configuration file and receive a service requested in the service request; and send the configuration file to the UE device in response to determining, based on the information contained in the SSL_CLIENT_S_DN_CN field in the client certificate, that the UE device is authorized to access the configuration file and receive the service requested in the service request.

In an embodiment, the server processor may be configured with server-executable instructions to determine, based on the information in the SSL_CLIENT_S_DN_CN field in the client certificate, whether the UE device is authorized to access the configuration file and receive the service requested in the service request by determining whether the UE device is authorized to receive a voice over internet protocol service. In a further embodiment, the server processor may be configured with server-executable instructions to determine, based on the information in the SSL_CLIENT_S_DN_CN field in the client certificate, whether the UE device is authorized to access the configuration file and receive the service requested in the service request by using a public key infrastructure (PKI) and the information contained in the SSL_CLIENT_S_DN_CN field in the client certificate to identify the UE device; and communicate with a provisioning server to determine whether the UE device is currently authorized to access the configuration file and receive the service requested in the service request.

In a further embodiment, the server processor may be configured with server-executable instructions to establish a transport layer security connection with the UE device by sending a server certificate to the UE device, verifying an authenticity of the client certificate, and determining whether that the UE device belongs to a group of approved devices that are each authorized to connect to a service provider network and communicate with the server computing device. In a further embodiment, the server processor may be configured with server-executable instructions to receive the service request and the client certificate that includes the information in the SSL_CLIENT_S_DN_CN field by receiving a signed client certificate that is signed by a root certificate authority component associated with a manufacturer of the UE device.

In a further embodiment, the server processor may be configured with server-executable instructions to receive the service request and the client certificate that includes the information in the SSL_CLIENT_S_DN_CN field by receiving an HTTP GET message that includes the client certificate and a $file variable.

In a further embodiment, the server processor may be configured with server-executable instructions to determine, based on the information in the SSL_CLIENT_S_DN_CN field in the client certificate, whether the UE device is authorized to access the configuration file and receive the service requested in the service request by verifying an authenticity of the client certificate; verifying that the UE device belongs to a group of approved devices that are authorized to connect to an associated service provider network; sending an System Access Device Get All Request command/call to extended services platform (XSP) component in response to verifying the authenticity of the client certificate and verifying that the UE device belongs to the group of approved devices, receiving an System Access Device Get All Response from the XSP, parsing the System Access Device Get All Response for variables $spid, $gid, $device, and $deviceType, sending an System Access Device File Get List Request command to the XSP in response to receiving and parsing the System Access Device Get All Response, receiving an System Access Device File Get List Response message from the XSP in response to sending the System Access Device File Get List Request command to the XSP, the System Access Device File Get List Response message including a list of configuration files the UE device is allowed to access, and determining whether the $file variable is included in the list of configuration files.

In a further embodiment, the server processor may be configured with server-executable instructions to send an HTTPS GET $Repository_URL message to a provisioning server; receive a HTTPS XML file that includes a content of the configuration file associated with the $file variable; and send the HTTPS XML file to the UE device in response to determining that the $file variable is included in the list of configuration files. In a further embodiment, the server processor may be configured with server-executable instructions to send an SIP Device Type File Get List Request to a provisioning server; receive an SIP Device Type File Get List Response from the provisioning server; and determine whether the $file variable is included in the SIP Device Type File Get List Response in response to determining that the $file variable is not included in the list of configuration files.

In a further embodiment, the server processor may be configured with server-executable instructions to send an HTTPS GET $Repository_URL message to the provisioning server; receive an HTTPS XML file that includes a content of the configuration file associated with the $file variable; send the HTTPS XML file to the UE device in response to determining that the $file variable is included in the SIP Device Type File Get List Response; and send an HTTPS ERROR message to the UE device in response to determining that the $file variable is not included in the SIP Device Type File Get List Response.

Further embodiments may include a non-transitory computer readable storage medium having stored thereon processor-executable software instructions configured to cause a server processor in a computing system that implements a zero touch configuration proxy (ZTCP) to perform operations for provisioning user equipment (UE) devices, the operations including receiving a service request and a client certificate that includes information in a SSL_CLIENT_S_DN_CN field from a UE device; determining, based on the information in the SSL_CLIENT_S_DN_CN field in the client certificate, whether the UE device is authorized to access a configuration file and receive a service requested in the service request; and sending the configuration file to the UE device in response to determining, based on the information contained in the SSL_CLIENT_S_DN_CN field in the client certificate, that the UE device is authorized to access the configuration file and receive the service requested in the service request.

In an embodiment, the stored processor-executable software instructions may be configured to cause the server processor to perform operations such that determining, based on the information in the SSL_CLIENT_S_DN_CN field in the client certificate, whether the UE device is authorized to access the configuration file and receive the service requested in the service request includes determining whether the UE device is authorized to receive a voice over internet protocol service. In a further embodiment, the stored processor-executable software instructions may be configured to cause the server processor to perform operations such that determining, based on the information in the SSL_CLIENT_S_DN_CN field in the client certificate, whether the UE device is authorized to access the configuration file and receive the service requested in the service request includes using a public key infrastructure (PKI) and the information contained in the SSL_CLIENT_S_DN_CN field in the client certificate to identify the UE device; and communicating with a provisioning server to determine whether the UE device is currently authorized to access the configuration file and receive the service requested in the service request.

In a further embodiment, the stored processor-executable software instructions may be configured to cause the server processor to perform operations further including establishing a transport layer security connection with the UE device by sending a server certificate to the UE device; verifying an authenticity of the client certificate; and determining whether that the UE device belongs to a group of approved devices that are each authorized to connect to a service provider network and communicate with the computing system. In a further embodiment, the stored processor-executable software instructions may be configured to cause the server processor to perform operations such that receiving the service request and the client certificate that includes the information in the SSL_CLIENT_S_DN_CN field includes receiving a signed client certificate that is signed by a root certificate authority component associated with a manufacturer of the UE device.

In a further embodiment, the stored processor-executable software instructions may be configured to cause the server processor to perform operations such that receiving the service request and the client certificate that includes the information in the SSL_CLIENT_S_DN_CN field includes receiving an HTTP GET message that includes the client certificate and a $file variable. In a further embodiment, the stored processor-executable software instructions may be configured to cause the server processor to perform operations such that determining, based on the information in the SSL_CLIENT_S_DN_CN field in the client certificate, whether the UE device is authorized to access the configuration file and receive the service requested in the service request includes verifying an authenticity of the client certificate; verifying that the UE device belongs to a group of approved devices that are authorized to connect to an associated service provider network; sending an System Access Device Get All Request command/call to extended services platform (XSP) component in response to verifying the authenticity of the client certificate and verifying that the UE device belongs to the group of approved devices; receiving an System Access Device Get All Response from the XSP; parsing the System Access Device Get All Response for variables $spid, $gid, $device, and $deviceType; sending an System Access Device File Get List Request command to the XSP in response to receiving and parsing the System Access Device Get All Response; receiving an System Access Device File Get List Response message from the XSP in response to sending the System Access Device File Get List Request command to the XSP, the System Access Device File Get List Response message including a list of configuration files the UE device is allowed to access; and determining whether the $file variable is included in the list of configuration files.

In a further embodiment, the stored processor-executable software instructions may be configured to cause the server processor to perform operations further including sending an HTTPS GET $Repository_URL message to a provisioning server; receiving HTTPS XML file that includes a content of the configuration file associated with the $file variable; and sending the HTTPS XML file to the UE device in response to determining that the $file variable is included in the list of configuration files. In a further embodiment, the stored processor-executable software instructions may be configured to cause the server processor to perform operations further including sending an SIP Device Type File Get List Request to a provisioning server; receiving an SIP Device Type File Get List Response from the provisioning server; and determining whether the $file variable is included in the SIP Device Type File Get List Response in response to determining that the $file variable is not included in the list of configuration files.

In a further embodiment, the stored processor-executable software instructions may be configured to cause the server processor to perform operations further including sending an HTTPS GET $Repository_URL message to the provisioning server; receiving an HTTPS XML file that includes a content of the configuration file associated with the $file variable; sending the HTTPS XML file to the UE device in response to determining that the $file variable is included in the SIP Device Type File Get List Response; and sending an HTTPS ERROR message to the UE device in response to determining that the $file variable is not included in the SIP Device Type File Get List Response.

Further embodiments may include a server computing device that includes various means (e.g., processor, application specific integrated circuit, field programmable gate array, etc.) for performing the operations of the methods discussed above. For example, the server computing device may include means for receiving a service request and a client certificate that includes information in a SSL_CLIENT_S_DN_CN field from a user equipment (UE) device; means for determining, based on the information in the SSL_CLIENT_S_DN_CN field in the client certificate, whether the UE device is authorized to access a configuration file and receive a service requested in the service request; and means for sending the configuration file to the UE device in response to determining, based on the information contained in the SSL_CLIENT_S_DN_CN field in the client certificate, that the UE device is authorized to access the configuration file and receive the service requested in the service request.

In an embodiment, means for determining, based on the information in the SSL_CLIENT_S_DN_CN field in the client certificate, whether the UE device is authorized to access the configuration file and receive the service requested in the service request may include means for determining whether the UE device is authorized to receive a voice over internet protocol service. In a further embodiment, means for determining, based on the information in the SSL_CLIENT_S_DN_CN field in the client certificate, whether the UE device is authorized to access the configuration file and receive the service requested in the service request may include means for using a public key infrastructure (PKI) and the information contained in the SSL_CLIENT_S_DN_CN field in the client certificate to identify the UE device; and means for communicating with a provisioning server to determine whether the UE device is currently authorized to access the configuration file and receive the service requested in the service request.

In a further embodiment, the computing device may include means for establishing a transport layer security connection with the UE device by sending a server certificate to the UE device, verifying an authenticity of the client certificate, and determining whether that the UE device belongs to a group of approved devices that are each authorized to connect to a service provider network and communicate with the server computing device. In a further embodiment, means for receiving the service request and the client certificate that includes the information in the SSL_CLIENT_S_DN_CN field may include means for receiving a signed client certificate that is signed by a root certificate authority component associated with a manufacturer of the UE device. In a further embodiment, means for receiving the service request and the client certificate that includes the information in the SSL_CLIENT_S_DN_CN field may include means for receiving an HTTP GET message that includes the client certificate and a $file variable.

In a further embodiment, means for determining, based on the information in the SSL_CLIENT_S_DN_CN field in the client certificate, whether the UE device is authorized to access the configuration file and receive the service requested in the service request may include means for verifying an authenticity of the client certificate; means for verifying that the UE device belongs to a group of approved devices that are authorized to connect to an associated service provider network; means for sending an System Access Device Get All Request command/call to extended services platform (XSP) component in response to verifying the authenticity of the client certificate and verifying that the UE device belongs to the group of approved devices; means for receiving an System Access Device Get All Response from the XSP; means for parsing the System Access Device Get All Response for variables $spid, $gid, $device, and $deviceType; means for sending an System Access Device File Get List Request command to the XSP in response to receiving and parsing the System Access Device Get All Response; means for receiving an System Access Device File Get List Response message from the XSP in response to sending the System Access Device File Get List Request command to the XSP, the System Access Device File Get List Response message including a list of configuration files the UE device is allowed to access; and means for determining whether the $file variable is included in the list of configuration files.

In a further embodiment, the computing device may include means for sending an HTTPS GET $Repository_URL message to a provisioning server, receiving HTTPS XML file that includes a content of the configuration file associated with the $file variable; and means for sending the HTTPS XML file to the UE device in response to determining that the $file variable is included in the list of configuration files. In a further embodiment, the computing device may include means for sending an SIP Device Type File Get List Request to a provisioning server; means for receiving an SIP Device Type File Get List Response from the provisioning server; and means for determining whether the $file variable is included in the SIP Device Type File Get List Response in response to determining that the $file variable is not included in the list of configuration files.

In a further embodiment, the computing device may include means for sending an HTTPS GET $Repository_URL message to the provisioning server, receiving an HTTPS XML file that includes a content of the configuration file associated with the $file variable; means for sending the HTTPS XML file to the UE device in response to determining that the $file variable is included in the SIP Device Type File Get List Response; and means for sending an HTTPS ERROR message to the UE device in response to determining that the $file variable is not included in the SIP Device Type File Get List Response.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various embodiments.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various embodiments include methods, and network components (e.g., a server computing devices, etc.) configured to implement the methods of provisioning user equipment devices. A server computing device that implements a zero touch configuration proxy (ZTCP) may be configured to receive a service request for a specified service and a client certificate that includes information in a SSL_CLIENT_S_DN_CN field from a user equipment (UE) device that is to be provisioned. The server computing device may determine, based on the information contained in the SSL_CLIENT_S_DN_CN field in the client certificate, whether the UE to be provisioned is authorized to receive a specified service requested in the service request. The server computing device may also determine, based on information in the SSL_CLIENT_S_DN_CN field in the client certificate, whether the UE device is authorized to access a configuration file stored in a provisioning system (e.g., in a profile server of the provisioning system, etc.). The server computing device may retrieve and send the configuration file to the UE device in response to determining, based on the information in the SSL_CLIENT_S_DN_CN field in the client certificate, that the UE device is authorized to access the configuration file and utilize the requested specified service.

The various embodiments disclosed herein overcome various technical challenges associated with provisioning UE devices by reducing or eliminating many time consuming, tedious and labor intensive operations that are typically performed when using conventional solutions. As a result, the various embodiments disclosed herein reduce the costs associated with provisioning devices, and improve the performance, efficiency and functioning of the provisioning system, service provider network and the components/devices that are included in, utilize, or benefit from the provisioning system and service provider network. Other improvements to performance and functioning of the systems/networks and their constituent components will be evident from the disclosures below.

The term "service provider network" is used generically herein to refer to any communication network suitable for providing consumers with access to the Internet or IP services over broadband connections, and may encompass both wired and wireless networks/technologies. Examples of wired network technologies and networks that may be included within a service provider network include cable networks, fiber optic networks, hybrid-fiber-cable networks, Ethernet, local area networks (LAN), metropolitan area networks (MAN), wide area networks (WAN), networks that implement the data over cable service interface specification (DOCSIS), networks that utilize asymmetric digital subscriber line (ADSL) technologies, etc. Examples of wireless network technologies and networks that may be included within a service provider network include third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), high-speed downlink packet access (HSDPA), 3GSM, general packet radio service (GPRS), code division multiple access (CDMA) systems (e.g., cdma-One, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), Bluetooth®, land mobile radio (LMR), and integrated digital enhanced network (iden). Each of these wired and wireless technologies involves, for example, the transmission and reception of data, signaling and/or content messages.

Any references to terminology and/or technical details related to an individual wired or wireless communications standard or technology are for illustrative purposes only, and not intended to limit the scope of the claims to a particular communication system or technology unless specifically recited in the claim language.

The term "user equipment (UE)" may be used herein to refer to any one or all of satellite or cable set top boxes, laptop computers, rack mounted computers, routers, cellular telephones, smart phones, VoIP phones or equipment, VoLTE phones or equipment, personal or mobile multimedia players, personal data assistants (PDAs), customer-premises equipment (CPE), personal computers, tablet computers, smart books, palm-top computers, desk-top computers, wireless electronic mail receivers, multimedia Internet enabled cellular telephones, wireless gaming controllers, streaming media players (such as, ROKU™), smart televisions, digital video recorders (DVRs), modems, routers, network switches, residential gateways (RG), access nodes (AN), bridged residential gateway (BRG), fixed mobile convergence products, home networking adapters and Internet access gateways that enable consumers to access communications service providers' services and distribute them around their house via a local area network (LAN), and similar electronic devices which include a programmable processor and memory and circuitry for providing the functionality described herein.

As used in this application, the terms "component," "module," "node," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, a computing device, a server computing device, and/or a computing system. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or network related communication methodologies.

The dynamic host configuration protocol (DHCP) may be a network management protocol used on UDP/IP networks whereby a DHCP server dynamically assigns an IP address and other network configuration parameters to each UE device on the LAN so the UE device may communicate with other UE devices and IP networks on the WAN. The DHCP server may enable UE devices to request IP addresses and networking parameters automatically from the service provider, thereby reducing the need for a network administrator or a user to manually assign the IP addresses to each of the UE devices.

The Session Initiation Protocol (SIP) may be a signaling protocol used for initiating, maintaining, and terminating real-time sessions that include voice, video and messaging applications. SIP may be used for signaling and controlling multimedia communication sessions in applications of Internet telephony for voice and video calls, in private IP telephone systems, in instant messaging over Internet Protocol (IP) networks, in voice-over IP (VoIP) and voice-over-LTE (VoLTE), and other similar services.

The Transport Layer Security (TLS) protocol may be a communication protocol that may be used for transferring data between a client UE device and a server/host device. The transport layer refers to the middle layer of the open system interconnection (OSI) networking model, which is responsible for end-to-end error recovery and flow control to ensure complete data transfer. A secure TLS connection may be formed by passing encrypted information messages that are decrypted by each entity in order to mutually authenticate one another. The mutual authentication verifies that each entity is in possession of a valid, encrypted certificate, and that each entity belongs to a group of approved entities.

Client or subscriber provisioning may be a necessary and important part of activating a new UE device to use services (e.g., VoIP, etc.) of the service provider network. During provisioning, the UE device is configured to point to the service provider network, bind to the correct line and the service profile, and interact properly with the services being delivered via the service provider network. Within the service provider network, hosted services (and their corresponding Application Servers) may be provisioned to recognize authorized UE devices and deliver services in a manner that is compatible with the capabilities of each UE device and service provider network.

Conventional provisioning techniques typical involve performing a significant number of operations before a new user or UE device may be added to the service provider network and/or commence using a service. While conventional solutions, such as BroadWorks® from BROADSOFT®, may automate some of the network-based embodiments of provisioning, these solutions/techniques still involve a technician associated with the equipment manufacturer, third party, or service provider performing a number of tedious, time consuming and labor intensive operations.

For example, conventional solutions for provisioning a new UE device, such as BroadWorks® from BROADSOFT®, may require that a warehouse technician scan, add or upload a UE device's serial number and MAC address (often printed on the box) into a cut sheet or a document that identifies various technical characteristics of the UE device. Due to security and other considerations, these conventional solutions may also require that the technician remove the UE device from its box, connect the UE device to a staging environment in the warehouse, type a username and authorization credentials (e.g., password) on the UE device's user interface, wait for the UE device to download configuration information from a webserver (e.g., XSP server, etc.), disconnect the UE device, repackage the UE device in its original box and distribute the UE device to its intended service location. These operations may improve security by ensuring that a UE device does not receive a service or configuration file for which it is not authorized. However, these operations are also tedious, time consuming and labor intensive. In instances of provisioning a large number of UE devices, such conventional operations could add significant time, expenses and/or consume significant human and computing resources of the equipment manufacturer, third party or service provider. For these and other reasons, conventional provisioning techniques and solutions are not adequate for provisioning a large number of UE devices.

The various embodiments disclosed herein include methods, and components (e.g., a zero touch configuration proxy, etc.) configured to securely provision UE devices without the conventional tedious, time consuming, or labor intensive operations that consume human and computing resources of the equipment manufacturer, third party and/or service provider. By eliminating the tedious, time consuming or labor intensive operations, the various embodiments disclosed herein reduce costs associated with provisioning a large number of UE devices, and improve the performance and functioning of the components involved in provisioning the UE devices.

Some embodiments may include a server computing device that includes a processor configured to implement all or portions of a zero touch configuration proxy (ZTCP) component. The ZTCP component may be configured to use a public key infrastructure (PKI) to uniquely identify a specific UE device, determine whether the UE device requests a configuration file that the UE device is authorized to access, and provide the configuration file to the UE device in response to determining that the UE device is authorized to access the configuration file and/or receive the requested specified service.

A UE device may be equipped with a client certificate that includes a MAC address and uniquely identifies the UE device. The client certificate may be signed by a root certificate authority component that is owned, operated, or otherwise associated with the UE device's manufacturer. Since the client certificate may be signed by the root certificate authority, it cannot be readily forged or altered.

The UE device may use the client certificate to perform various operations to establish a TLS connection to the ZTCP component. For example, the UE device may send the client certificate to the ZTCP component, request and receive a server certificate from the ZTCP component, and use the received certificate to verify the authenticity of the ZTCP component.

The ZTCP component may be configured to perform various operations for establishing a TLS connection with the UE device, such as sending a server certificate to the UE device, verifying the authenticity of the client certificate, and ensuring that the UE device belongs to a group of approved devices that are each authorized to connect to the service provider network and communicate with the ZTCP component. In addition, the ZTCP component may use a public key infrastructure (PKI) and the SSL_CLIENT_S_DN_CN field in the client certificate to uniquely identify the UE device, and issue a series of commands/API calls to a provisioning system to determine whether the specific UE device is currently authorized to receive a particular specified service (e.g., VoIP, etc.) and/or whether the specific UE device is allowed to access the requested configuration file. The ZTCP component may send the configuration file to the UE device in response to determining, based on the information contained in the SSL_CLIENT_S_DN_CN field in the client certificate, that the UE device is authorized to access the configuration file and receive the requested specified service.

Figure 1:
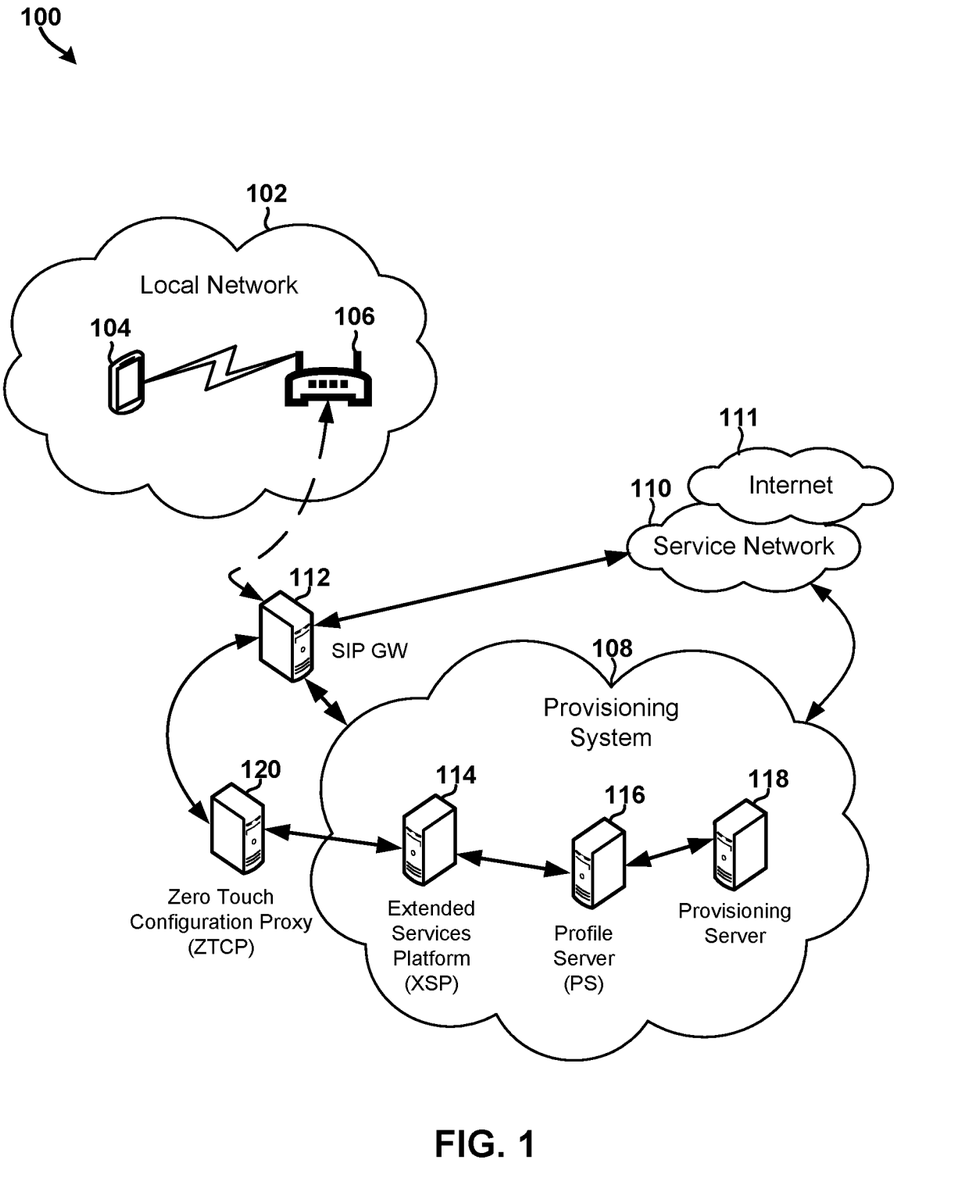
FIG. 1 is a block diagram of an example system that includes a provisioning system suitable for use with the various embodiments.

FIG. 1 illustrates example system 100 that may be used to implement the various embodiments. In the example illustrated in FIG. 1, the system 100 may include a local network 102, a SIP Gateway (SIP GW) 112 component/device, a zero touch configuration proxy (ZTCP) 120 component/device, a provisioning system 108 and a service provider network 110 that may provide a communication link to the Internet 111 or other WAN. The local network 102 may include user equipment (UE) 104 devices coupled to a customer premise equipment (CPE) 106 component/device via wired or wireless communication links. The provisioning system 108 may include an extended services platform (XSP) 114 component/device, a profile server (PS) 116 component/device, and a provisioning server 118 component/device. The service provider network 110 may include various network components (not illustrated separately in FIG. 1) for providing consumers with access to the Internet 111 or IP services over broadband connections.

The CPE 106 may include a cable modem, digital subscriber line modem, router, switch, firewall, packet filter, wireless access point, and/or a residential gateway that provides network connectivity to the UE 104 devices in the local network 102. In various embodiments, the CPE 106 may be, may include, or may include communication links to, a SIP Gateway (SIP GW) 112 component/device that operates to facilitate communications between the devices in the local network 102 and other components in the system 100. In some embodiments, the SIP GW 112 component/device may be implemented as part of the CPE 106 device. Thus, the CPE 106 may communicate directly with the ZTCP component 120, service network 110 and provisioning system 108, or in other embodiments may be coupled to the ZTCP component 120, service network 110 and provisioning system 108 via the SIP gateway 112.

DHCP server functionally may be provided locally in the local network 102 (e.g., via the CPE 106) or remotely via a server outside of the local network 102 (e.g., via the SIP GW 112). For example, the CPE 106 and/or SIP GW 112 may include a DHCP server (not illustrated separately in FIG. 1)

that stores IP addresses and information about client configuration parameters such as default gateway, domain name, the name servers, time servers, MAC addresses, hostnames, etc. When a UE 104 device requests to establish a connection to the local network 102 (e.g., after booting, etc.) serviced by the CPE 106 and/or SIP GW 112, the UE 102 device broadcasts a DHCP query for network information. The DHCP server services the request by sending network and lease information to the UE 102 device. The network information may include a network address (e.g., an IP address, etc.) that is necessary for that UE 102 device to connect to the local network 102 to use services (e.g., VoIP) provided by the service network 110 and connect to the Internet 111.

Client or subscriber provisioning may be required to activate a new UE 104 device to use services (e.g., VoIP, etc.) made available service provider network. As part of these operations, the UE 104 device may be required to communicate with the provisioning server 118.

Before the UE 104 device may commence communicating with the provisioning server 118 (e.g., via intermediate components), a corresponding "access profile" may be defined for that device. An access profile may specify the signaling and media capabilities of the UE 104 device. This allows the provisioning server 118 to tailor service delivery to match the specific capabilities of each UE 104 device in the system 100. For instance, one UE 104 device may support dynamic registration, while another UE 104 device may need to have its contact address provisioned statically. Another UE 104 device may support multiple call appearances, while another UE 104 device may require waiting calls to be managed in the service provider network. By defining unique access profiles for each of these UE 104 device types, the provisioning server 118 can adjust the way it signals to each UE 104 device accordingly. The access profile also defines the number of "ports" or unique line addresses that the UE 104 device supports. As ports are assigned to line addresses, the provisioning server 118 keeps track of which port is allocated and which port is free. This helps operators manage not only the inventory of UE 104 device in the network, but also the number of ports that are in use as well.

UE 104 devices may publish a device configuration guide (or a cut sheet, document, etc.) that describes the UE 104 device capabilities and how the UE 104 device integrates with the provisioning server 118. Part of the UE 104 device configuration guide may describe the exact access profile that should be created on the provisioning server 118 to properly define the signaling and media capabilities of the UE 104 device.

To simplify deployment, the provisioning server 118 may also allow "configuration profiles" to be defined for each UE 104 device. A configuration profile may define all the attributes and settings required for the device to connect to the network and deliver service. The provisioning server 118 may use the configuration profile to generate configuration files. The configuration files may be stored in a configuration file repository and made accessible to the UE 104 devices (e.g., via intermediate components).

In some embodiments, the provisioning server 118 may store the generated configuration files on, or make the configuration files otherwise accessible to, the PS 116 component/device. The PS 116 component/device may provide a geographically redundant, highly available, scalable storage for the generated configuration files.

UE 104 devices may request configuration files through the XSP 114 component/device, which provides secure access based on HTTP, HTTPS, and other transports. For example, digest authentication over HTTP may be used to securely identify the requesting UE 104 device without transmitting unencrypted credential information. Secure Sockets Layer (SSL) over HTTPS may be used for the device requests when confidentiality required for the transmitted configuration files.

The provisioning server 118 may be configured to integrate or relate services with features on the UE 104 device. This is particularly important for hosted solutions, such as a VoIP or Private Branch Exchange, where advanced business services, such as Shared Call Appearances and Busy Lamp Field (BLF), require attribute values to be set in both the provisioning server 118 and the UE 104 device before the service operates properly. For instance, the BLF service on the provisioning server 118 may require the use of a SIP dialog event package. To access this specified service, the UE 104 device may be required to subscribe to a specific SIP URI representing the specific user's BLF state. Using conventional solutions, this SIP URI must be provisioned on both the user's service profile as well as any UE 104 device they wish to use to access the service. The provisioning system 108 may set this value on the user's service profile, which may trigger the provisioning server 118 to update any corresponding device configuration files and deposit them on the configuration file repository of the Profile Server 116 component/device. If the changes are to take effect immediately, the service provider may initiate a remote reboot of the affected UE 104 devices.

In addition to configuration files, a UE 104 device may require one or more resource files before the UE 104 device may access or use a service. Resources files may include bitmaps, audio files, contact directory files, etc. The most common type of resource files are firmware files that represent the current version of software embedded in the UE 104 device. The provisioning server 118 may manage which UE 104 device uses which version of a resource file. This allows service providers to control which version of firmware is deployed in the network, and to easily roll out new versions of firmware in a controlled and predictable manner Specific group resources may be deployed to subsets of users in the network by customizing resources at the corresponding group level. This allows service providers to present specific backgrounds or logos to the liquid crystal display (LCD) display on Internet Protocol (IP) devices (e.g., UE 104, etc.) or provide custom ring tones tailored to specific user requests.

The provisioning server 118 may maintain a list of all UE 104 devices that are provisioned in the network. The list of UE 104 devices may be integrated into the same database that manages all users, lines, and services in the service network 110 so that the provisioning server 118 can track relationships between UE 104 devices, the ports that are free, the ports that are in use, and the corresponding users who are associated with each port on the UE 104 device. This information may be important for tracking the state of UE 104 devices in the service network 110 and troubleshooting problems on the access network.

New UE 104 devices profile types may be added to the provisioning system 108 via a command line interface (CLI) or Open Client Interface-Provisioning (OCI-P). Since conventional provisioning methods require a number of operations and lots of details, and provisioning is only done infrequently, often a system administrator logs in and creates UE 104 device profile type through the web portal. In the various embodiments, the ZTCP 120 component/device may be configured to use the OCI-P to add UE 104 device profile types, as well as determine whether the specific UE 104 device is currently authorized to receive a particular service (e.g., VoIP, etc.) and/or whether the specific UE 104 device is allowed to access a requested configuration file.

Figure 2:
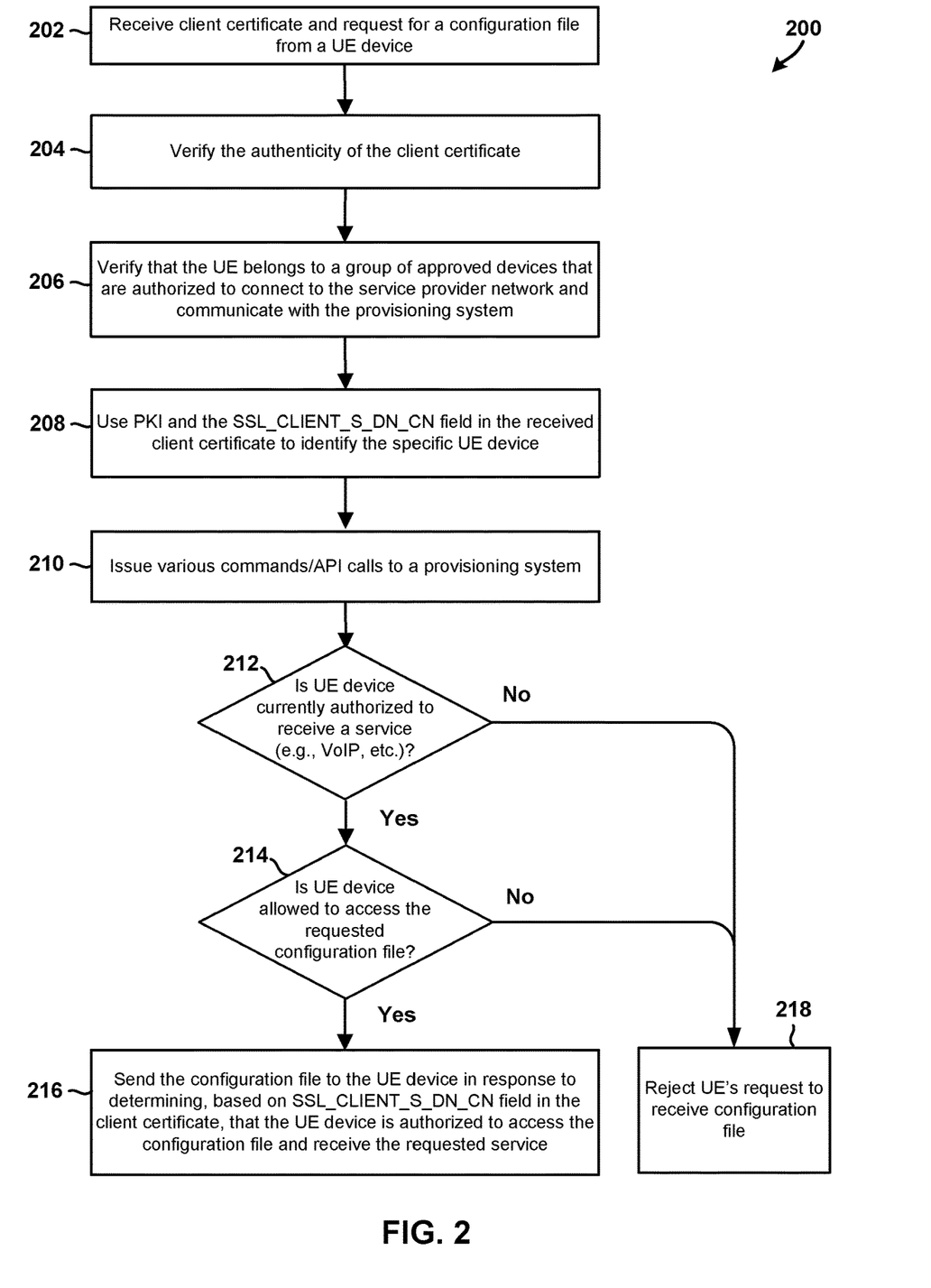
FIG. 2 is a process flow diagram that illustrates a method for provisioning user devices in accordance with an embodiment.

FIG. 2 illustrates a method 200 for provisioning UE 104 devices in accordance with an embodiment. Method 200 may be performed via a processor of a computing system that implements all or portions of a zero touch configuration proxy (ZTCP) component (e.g., ZTCP 120 illustrated in FIG. 1). It should be understood that the operations in method 200 may be performed in any order. For example, in various embodiments, the operations in block 208 may be performed before or after the operations in block 210. As another example, in various embodiments, the operations in determination block 212 may be performed before or after the operations in determination block 214.

In block 202, the processor may receive client certificate and request for a configuration file (or a request for provisioning) from a UE 104 device.

In block 204, the processor may verify the authenticity of the received client certificate.

In block 206, the processor may verify that the UE 104 device belongs to a group of approved devices that are authorized to connect to the service provider network and communicate with the provisioning system.

In block 208, the processor may use PKI and information contained in the SSL_CLIENT_S_DN_CN field of the received client certificate to identify the specific UE 104 device.

In block 210, the processor may issue various commands/API calls to a provisioning system, and receive corresponding responses.

In determination block 212, the processor may determine whether the specific UE 104 device is currently authorized to receive a specified requested service (e.g., VoIP, etc.). The processor may also determine whether the specific UE 104 device is allowed to access the requested configuration file in determination block 214.

In response to determining that the specific UE 104 device is not currently authorized to receive the requested specified service (i.e., determination block 212="No") or that the specific UE device is not allowed to access the requested configuration file (i.e., determination block 214="No"), the processor may reject UE 104 device's request to receive configuration file in block 218.

In response to determining that the specific UE 104 device is currently authorized to receive the requested specified service (i.e., determination block 212="Yes") and the specific UE 104 device is allowed to access the requested configuration file (i.e., determination block 214="Yes"), the processor may send the configuration file to the UE 104 device in block 216. Said another way, the ZTCP 120 may send the configuration file to the UE 104 device in response to determining, based on information contained in the SSL_CLIENT_S_DN_CN field of the client certificate, that the UE 104 device is authorized to access the configuration file and receive the requested specified service.

Figure 3:
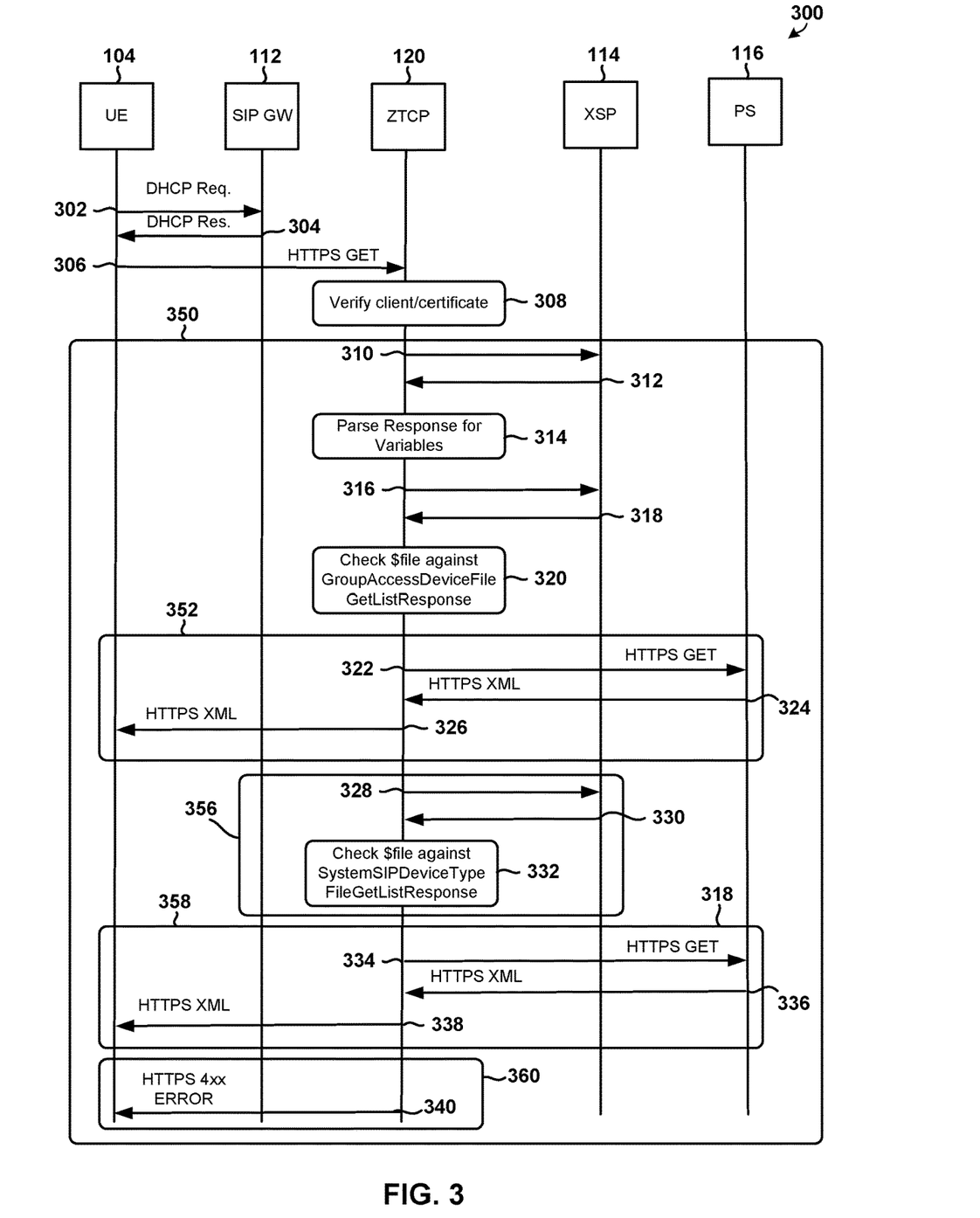
FIG. 3 is a message flow diagram that illustrates component and communications in a system configured to provision user equipment devices in accordance with an embodiment.

FIG. 3 illustrates components and communication message flows in a system 300 configured to provision UE devices in accordance with an embodiment. In the example illustrated in FIG. 3, the system 300 includes a UE 104 component/device, a Session Initiation Protocol Gateway (SIP GW) 112 component/device, a Zero Touch Configuration Proxy (ZTCP) 120 component/device, an Extended Services Platform (XSP) 114 component/device, and a Profile Server (PS) 116 component/device.

In message 302, the UE 104 device may broadcast or send a DHCP request message to the SIP GW 112. The DHCP request message may be DHCP query for network information, such as the XSP server URL.

In message 304, the SIP GW 112 may send a DHCP response message to the UE 104 device. The DHCP response message may include network and lease information (e.g., an IP address, etc.) that is necessary for that UE 104 device to connect to the network and communicate with ZTCP 120. The DHCP response message may include the ZTCP server URL (instead of the XSP server URL) in DHCP Options 159 and 160.

In message 306, the UE 104 device may send an HTTP GET message to the ZTCP 120. The HTTP GET message may include a client certificate, a $file variable or a request for a configuration file, and/or various information contained in the SSL_CLIENT_S_DN_CN field in the client certificate.

In operation block 308, the ZTCP 120 may verify the client and/or client certificate (e.g., via SSL_CLIENT_VERIFY, etc.). For example, the ZTCP 120 may verify the authenticity of the received client certificate and that the UE 104 device belongs to a group of approved devices that are authorized to connect to the service provider network or communicate with the provisioning system 108.

If the verification operations in operation block 308 are successful, the system may perform the operations in block 350.

In message 310, the ZTCP 120 may send an (OCI-P) System Access Device Get All Request (SSL_CLCIENT_S_DN_CN) command/call to the XSP 114.

In message 312, the XSP 114 may send an (OCI-P) System Access Device Get All Response to the ZTCP 120.

In operation block 314, the ZTCP 120 may receive and parse the System Access Device Get All Response for variables (e.g., $spid, $gid, $device, $deviceType, etc.).

In message 316, the ZTCP 120 may send an (OCI-P) System Access Device File Get List Request 14 sp8 ($spid, $gid, $device) command/call to the XSP 114.

In message 318, the XSP 114 may send an (OCI-P) System Access Device File Get List Response message to the ZTCP 120. The System Access Device File Get List Response message may include a list of all configuration files the device is allowed to access.

In operation block 320, the ZTCP 120 may check the $file against Group Access Device File Get List Response.

In response to determining that the $file variable is included in the Group Access Device File Get List Response (e.g., in operation block 320), the system may send and receive the messages in block 352. For example, in message 322, the ZTCP 120 may send an HTTPS GET $Repository_URL message to the PS 116. In message 324, the PS 116 may send an HTTPS XML message or file that includes the contents of the requested file (e.g., $file) to the ZTCP 120. In message 326, the ZTCP 120 may send the HTTPS XML message or file to the UE 104 device.

In response to determining that the $file variable is not included in the Group Access Device File Get List Response (e.g., in operation block 320), the system may send and receive the messages and perform the operations in block 356. For example, in message 328, the ZTCP 120 may send an (OCI-P) System SIP Device Type File Get List Request 14 sp8 ($deviceType) command/call to the PS 116. In message 330, the PS 116 may send an (OCI-P) System SIP Device Type File Get List Response 14 sp8 to the ZTCP 120. In operation block 332, the ZTCP 120 may check the $file against the System SIP Device Type File Get List Response.

In response to determining that the $file variable is included in the System SIP Device Type File Get List Response (e.g., in operation block 332), the system may perform the send and receive messages in block 358. For example, in message 334, the ZTCP 120 may send an HTTPS GET $Repository_URL message to the PS 116. In message 336, the PS 116 may send an HTTPS XML message or file that includes the contents of the requested file (e.g., $file) to the ZTCP 120. In message 338, the ZTCP 120 may send the HTTPS XML message or file to the UE 104 device.

In response to determining that the $file variable is not included in the System SIP Device Type File Get List Response (e.g., in operation block 332), the system may send the message in block 360. For example, in message 340, the ZTCP 120 may send an HTTPS 4xx ERROR message to the UE 104 device.

Figure 4:
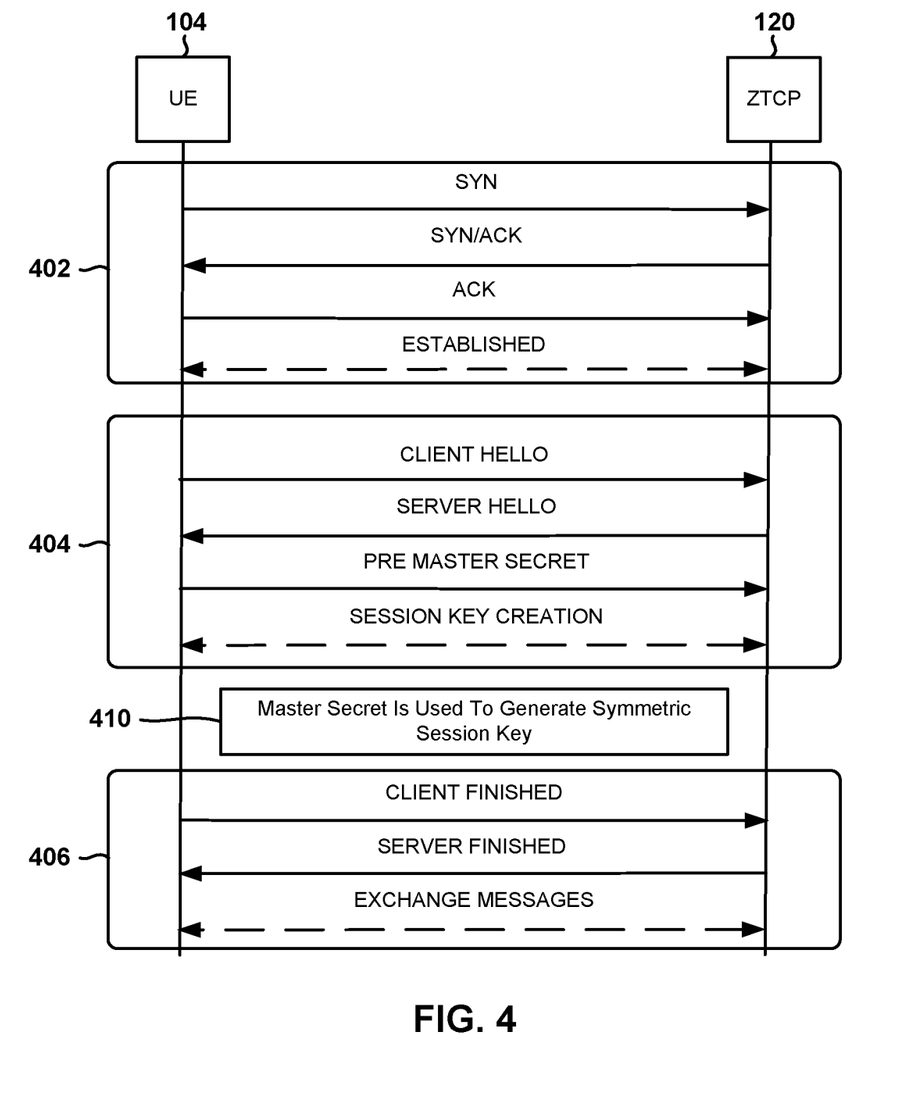
FIG. 4 is a call flow diagram that illustrates communications and interactions between a user equipment device and a zero touch configuration proxy when provisioning the user equipment device in accordance with an embodiment.

FIG. 4 illustrates components and communications between UE 104 component/device and a ZTCP 120 component/device configured to provision UE devices in accordance with the various embodiment. In particular, FIG. 4 represent the standard transport layer security (TLS) protocol handshake between UE 104 and the ZTCP 120 component/device (e.g., for Internet Engineering Task Force Request for Comments 8446 and its predecessors, etc.). Once the handshake is complete, the components may use the established keys to protect the application-layer traffic.

In block 402, the UE 104 component/device and the ZTCP 120 component/device may exchange SYN and ACK messages, and establish a connection. In block 404, the UE 104 component/device may send a Client Hello message to the ZTCP 120 component/device as its first TLS message. The ZTCP 120 component/device may respond by sending a Server Hello message to the UE 104 component/device. The UE 104 component/device may send a Pre Master Secret message to the ZTCP 120 component/device, and the UE 104 and the ZTCP 120 components/devices may create a session key. In block 410, the master secret may be used to generate a symmetric session key. In block 406, the UE 104 component/device may send a Client Finished message to the ZTCP 120 component/device, the ZTCP 120 component/device may respond by sending a Server Finished message to the UE 104 component/device, and the UE 104 and ZTCP 120 components/devices may commence exchanging messages.

Figure 5:
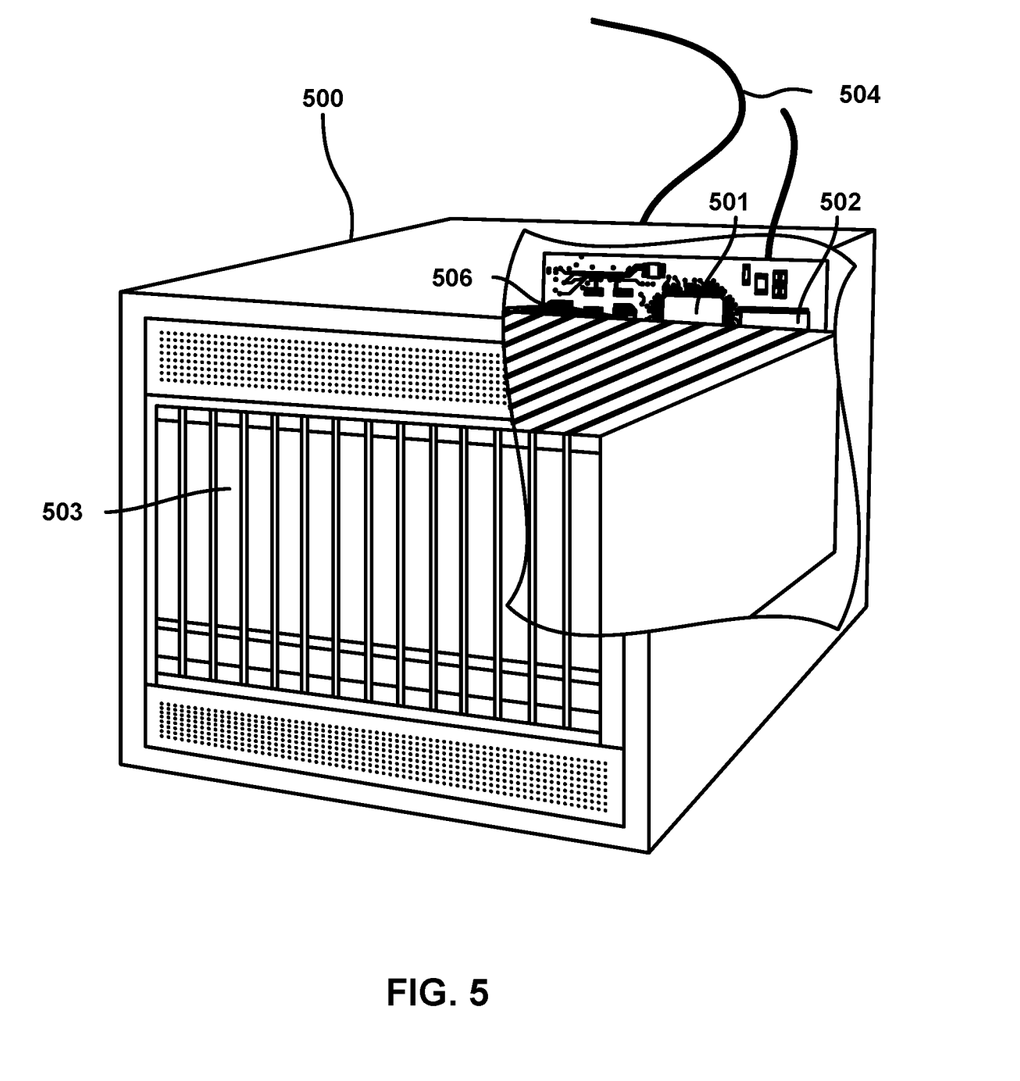
FIG. 5 is a component diagram of an example server suitable for implementing the various embodiments.

Various embodiments (including, but not limited to, embodiments discussed above with reference to FIGS. 1-4) may be implemented on any of a variety of commercially available computing devices, such as the server computing device 500 illustrated in FIG. 5. Such a server device 500 may include a processor 501 coupled to volatile memory 502 and a large capacity nonvolatile memory, such as a disk drive 503. The server device 500 may also include a floppy disc drive, USB, compact disc (CD) or DVD disc drive coupled to the processor 501. The server device 500 may also include network access ports 506 coupled to the processor 501 for establishing data connections with a network connection circuit 504 and a communication network (e.g., IP network) coupled to other communication system network elements.

The processors discussed in this application may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. For the purposes of this description, a general reference to memory refers to memory accessible by the processors including internal memory or removable memory plugged into the device and memory within the processors themselves. Additionally, as used herein, any reference to a memory may be a reference to a memory storage and the terms may be used interchangeable.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of provisioning user equipment (UE) devices, comprising:
   receiving, in a processor of a computing system that implements a zero touch configuration proxy (ZTCP), a service request and a client certificate that includes information in a SSL_CLIENT_S_DN_CN field from a UE device;
   determining, based on the information in the SSL_CLIENT_S_DN_CN field in the client certificate, whether the UE device is authorized to access a configuration file and receive a service requested in the received service request; and
   sending the configuration file to the UE device in response to determining, based on the information contained in the SSL_CLIENT_S_DN_CN field in the client certificate, that the UE device is authorized to access the configuration file and receive the service requested in the received service request.

2. The method of claim 1, wherein determining, based on the information in the SSL_CLIENT_S_DN_CN field in the client certificate, whether the UE device is authorized to access the configuration file and receive the service requested in the received service request comprises:
   determining whether the UE device is authorized to receive a voice over internet protocol service.

3. The method of claim 1, wherein determining, based on the information in the SSL_CLIENT_S_DN_CN field in the client certificate, whether the UE device is authorized to access the configuration file and receive the service requested in the received service request comprises:
   using a public key infrastructure (PKI) and the information contained in the SSL_CLIENT_S_DN_CN field in the client certificate to identify the UE device; and
   communicating with a provisioning server to determine whether the UE device is currently authorized to access the configuration file and receive the service requested in the service request.

4. The method of claim 1, further comprising establishing a transport layer security connection with the UE device by:
   sending a server certificate to the UE device;
   verifying an authenticity of the client certificate; and
   determining whether that the UE device belongs to a group of approved devices that are each authorized to connect to a service provider network and communicate with the computing system.

5. The method of claim 1, wherein receiving the service request and the client certificate that includes the information in the SSL_CLIENT_S_DN_CN field comprises receiving a signed client certificate that is signed by a root certificate authority component associated with a manufacturer of the UE device.

6. The method of claim 1, wherein receiving the service request and the client certificate that includes the information in the SSL_CLIENT_S_DN_CN field comprises receiving an HTTP GET message that includes the client certificate and a $file variable.

7. The method of claim 6, wherein determining, based on the information in the SSL_CLIENT_S_DN_CN field in the client certificate, whether the UE device is authorized to access the configuration file and receive the service requested in the received service request comprises:
   verifying an authenticity of the client certificate;
   verifying that the UE device belongs to a group of approved devices that are authorized to connect to an associated service provider network;
   sending an System Access Device Get All Request command/call to extended services platform (XSP) component in response to verifying the authenticity of the client certificate and verifying that the UE device belongs to the group of approved devices;
   receiving an System Access Device Get All Response from the XSP;
   parsing the System Access Device Get All Response for variables $spid, $gid, $device, and $deviceType;
   sending an System Access Device File Get List Request command to the XSP in response to receiving and parsing the System Access Device Get All Response;
   receiving an System Access Device File Get List Response message from the XSP in response to sending the System Access Device File Get List Request command to the XSP, the System Access Device File Get List Response message including a list of configuration files the UE device is allowed to access; and
   determining whether the $file variable is included in the list of configuration files.

8. The method of claim 7, further comprising:
   sending an HTTPS GET $Repository URL message to a provisioning server, receiving HTTPS XML, file that includes a content of the configuration file associated with the $file variable, and sending the HTTPS XML file to the UE device in response to determining that the $file variable is included in the list of configuration files.

9. The method of claim 7, further comprising:
sending an SIP Device Type File Get List Request to a provisioning server, receiving an SIP Device Type File Get List Response from the provisioning server, and determining whether the $file variable is included in the SIP Device Type File Get List Response in response to determining that the $file variable is not included in the list of configuration files.

10. The method of claim 9, further comprising:
sending an HTTPS GET $Repository_URL message to the provisioning server, receiving an HTTPS XML file that includes a content of the configuration file associated with the $file variable, and sending the HTTPS XML file to the UE device in response to determining that the $file variable is included in the SIP Device Type File Get List Response; and
sending an HTTPS ERROR message to the UE device in response to determining that the $file variable is not included in the SIP Device Type File Get List Response.

11. A server computing device, comprising:
a server processor configured with server-executable instructions to:
receive a service request and a client certificate that includes information in a SSL_CLIENT_S_DN_CN field from a user equipment (UE) device;
determine, based on the information in the SSL_CLIENT_S_DN_CN field in the client certificate, whether the UE device is authorized to access a configuration file and receive a service requested in the received service request; and
send the configuration file to the UE device in response to determining, based on the information contained in the SSL_CLIENT_S_DN_CN field in the client certificate, that the UE device is authorized to access the configuration file and receive the service requested in the received service request.

12. The server computing device of claim 11, wherein the server processor is configured with server-executable instructions to determine, based on the information in the SSL_CLIENT_S_DN_CN field in the client certificate, whether the UE device is authorized to access the configuration file and receive the service requested in the received service request by:
determining whether the UE device is authorized to receive a voice over internet protocol service.

13. The server computing device of claim 11, wherein the server processor is configured with server-executable instructions to determine, based on the information in the SSL_CLIENT_S_DN_CN field in the client certificate, whether the UE device is authorized to access the configuration file and receive the service requested in the received service request by:
using a public key infrastructure (PKI) and the information contained in the SSL_CLIENT_S_DN_CN field in the client certificate to identify the UE device; and
communicating with a provisioning server to determine whether the UE device is currently authorized to access the configuration file and receive the service requested in the service request.

14. The server computing device of claim 11, wherein the server processor is configured with server-executable instructions to establish a transport layer security connection with the UE device by:
sending a server certificate to the UE device;
verifying an authenticity of the client certificate; and
determining whether that the UE device belongs to a group of approved devices that are each authorized to connect to a service provider network and communicate with the server computing device.

15. The server computing device of claim 11, wherein the server processor is configured with server-executable instructions to receive the service request and the client certificate that includes the information in the SSL_CLIENT_S_DN_CN field by receiving a signed client certificate that is signed by a root certificate authority component associated with a manufacturer of the UE device.

16. The server computing device of claim 11, wherein the server processor is configured with server-executable instructions to receive the service request and the client certificate that includes the information in the SSL_CLIENT_S_DN_CN field by receiving an HTTP GET message that includes the client certificate and a $file variable.

17. The server computing device of claim 16, wherein the server processor is configured with server-executable instructions to determine, based on the information in the SSL_CLIENT_S_DN_CN field in the client certificate, whether the UE device is authorized to access the configuration file and receive the service requested in the received service request by:
verifying an authenticity of the client certificate;
verifying that the UE device belongs to a group of approved devices that are authorized to connect to an associated service provider network;
sending an System Access Device Get All Request command/call to extended services platform (XSP) component in response to verifying the authenticity of the client certificate and verifying that the UE device belongs to the group of approved devices;
receiving an System Access Device Get All Response from the XSP;
parsing the System Access Device Get All Response for variables $spid, $gid, $device, and $deviceType;
sending an System Access Device File Get List Request command to the XSP in response to receiving and parsing the System Access Device Get All Response;
receiving an System Access Device File Get List Response message from the XSP in response to sending the System Access Device File Get List Request command to the XSP, the System Access Device File Get List Response message including a list of configuration files the UE device is allowed to access; and
determining whether the $file variable is included in the list of configuration files.

18. The server computing device of claim 17, wherein the server processor is configured with server-executable instructions to:
send an HTTPS GET $Repository_URL message to a provisioning server, receiving HTTPS XML, file that includes a content of the configuration file associated with the $file variable, and sending the HTTPS XML file to the UE device in response to determining that the $file variable is included in the list of configuration files.

19. The server computing device of claim 17, wherein the server processor is configured with server-executable instructions to:
send an SIP Device Type File Get List Request to a provisioning server, receiving an SIP Device Type File Get List Response from the provisioning server, and determining whether the $file variable is included in the SIP Device Type File Get List Response in response to determining that the $file variable is not included in the list of configuration files.

20. The server computing device of claim 19, wherein the server processor is configured with server-executable instructions to:
send an HTTPS GET $Repository_URL message to the provisioning server, receiving an HTTPS XML file that includes a content of the configuration file associated with the $file variable, and sending the HTTPS XML file to the UE device in response to determining that the $file variable is included in the SIP Device Type File Get List Response; and
send an HTTPS ERROR message to the UE device in response to determining that the $file variable is not included in the SIP Device Type File Get List Response.

21. A non-transitory computer readable storage medium having stored thereon processor-executable software instructions configured to cause a server processor in a computing system that implements a zero touch configuration proxy (ZTCP) to perform operations for provisioning user equipment (UE) devices, the operations comprising:
receiving a service request and a client certificate that includes information in a SSL_CLIENT_S_DN_CN field from a UE device;
determining, based on the information in the SSL_CLIENT_S_DN_CN field in the client certificate, whether the UE device is authorized to access a configuration file and receive a service requested in the received service request; and
sending the configuration file to the UE device in response to determining, based on the information contained in the SSL_CLIENT_S_DN_CN field in the client certificate, that the UE device is authorized to access the configuration file and receive the service requested in the received service request.

22. The non-transitory computer readable storage medium of claim 21, wherein the stored processor-executable software instructions are configured to cause the server processor to perform operations such that determining, based on the information in the SSL_CLIENT_S_DN_CN field in the client certificate, whether the UE device is authorized to access the configuration file and receive the service requested in the received service request comprises:
determining whether the UE device is authorized to receive a voice over internet protocol service.

23. The non-transitory computer readable storage medium of claim 21, wherein the stored processor-executable software instructions are configured to cause the server processor to perform operations such that determining, based on the information in the SSL_CLIENT_S_DN_CN field in the client certificate, whether the UE device is authorized to access the configuration file and receive the service requested in the received service request comprises:
using a public key infrastructure (PKI) and the information contained in the SSL_CLIENT_S_DN_CN field in the client certificate to identify the UE device; and
communicating with a provisioning server to determine whether the UE device is currently authorized to access the configuration file and receive the service requested in the service request.

24. The non-transitory computer readable storage medium of claim 21, wherein the stored processor-executable software instructions are configured to cause the server processor to perform operations further comprising establishing a transport layer security connection with the UE device by:
sending a server certificate to the UE device;
verifying an authenticity of the client certificate; and
determining whether that the UE device belongs to a group of approved devices that are each authorized to connect to a service provider network and communicate with the computing system.

25. The non-transitory computer readable storage medium of claim 21, wherein the stored processor-executable software instructions are configured to cause the server processor to perform operations such that receiving the service request and the client certificate that includes the information in the SSL_CLIENT_S_DN_CN field comprises receiving a signed client certificate that is signed by a root certificate authority component associated with a manufacturer of the UE device.

26. The non-transitory computer readable storage medium of claim 21, wherein the stored processor-executable software instructions are configured to cause the server processor to perform operations such that receiving the service request and the client certificate that includes the information in the SSL_CLIENT_S_DN_CN field comprises receiving an HTTP GET message that includes the client certificate and a $file variable.

27. The non-transitory computer readable storage medium of claim 26, wherein the stored processor-executable software instructions are configured to cause the server processor to perform operations such that determining, based on the information in the SSL_CLIENT_S_DN_CN field in the client certificate, whether the UE device is authorized to access the configuration file and receive the service requested in the received service request comprises:
verifying an authenticity of the client certificate;
verifying that the UE device belongs to a group of approved devices that are authorized to connect to an associated service provider network;
sending an System Access Device Get All Request command/call to extended services platform (XSP) component in response to verifying the authenticity of the client certificate and verifying that the UE device belongs to the group of approved devices;
receiving an System Access Device Get All Response from the XSP;
parsing the System Access Device Get All Response for variables $spid, $gid, $device, and $deviceType;
sending an System Access Device File Get List Request command to the XSP in response to receiving and parsing the System Access Device Get All Response;
receiving an System Access Device File Get List Response message from the XSP in response to sending the System Access Device File Get List Request command to the XSP, the System Access Device File Get List Response message including a list of configuration files the UE device is allowed to access; and
determining whether the $file variable is included in the list of configuration files.

28. The non-transitory computer readable storage medium of claim 27, wherein the stored processor-executable software instructions are configured to cause the server processor to perform operations further comprising:
sending an HTTPS GET $Repository_URL message to a provisioning server, receiving HTTPS XML, file that includes a content of the configuration file associated with the $file variable, and sending the HTTPS XML file to the UE device in response to determining that the $file variable is included in the list of configuration files.

29. The non-transitory computer readable storage medium of claim 27, wherein the stored processor-executable software instructions are configured to cause the server processor to perform operations further comprising:
sending an SIP Device Type File Get List Request to a provisioning server, receiving an SIP Device Type File Get List Response from the provisioning server, and determining whether the $file variable is included in the SIP Device Type File Get List Response in response to determining that the $file variable is not included in the list of configuration files.

30. The non-transitory computer readable storage medium of claim 29, wherein the stored processor-executable software instructions are configured to cause the server processor to perform operations further comprising:
sending an HTTPS GET $Repository_URL message to the provisioning server, receiving an HTTPS XML file that includes a content of the configuration file associated with the $file variable, and sending the HTTPS XML file to the UE device in response to determining that the $file variable is included in the SIP Device Type File Get List Response; and
sending an HTTPS ERROR message to the UE device in response to determining that the $file variable is not included in the SIP Device Type File Get List Response.

31. A server computing device, comprising:
means for receiving a service request and a client certificate that includes information in a SSL_CLIENT_S_DN_CN field from a user equipment (UE) device;
means for determining, based on the information in the SSL_CLIENT_S_DN_CN field in the client certificate, whether the UE device is authorized to access a configuration file and receive a service requested in the received service request; and
means for sending the configuration file to the UE device in response to determining, based on the information contained in the SSL_CLIENT_S_DN_CN field in the client certificate, that the UE device is authorized to access the configuration file and receive the service requested in the received service request.

32. The server computing device of claim 31, wherein means for determining, based on the information in the SSL_CLIENT_S_DN_CN field in the client certificate, whether the UE device is authorized to access the configuration file and receive the service requested in the received service request comprises:
means for determining whether the UE device is authorized to receive a voice over internet protocol service.

33. The server computing device of claim 31, wherein means for determining, based on the information in the SSL_CLIENT_S_DN_CN field in the client certificate, whether the UE device is authorized to access the configuration file and receive the service requested in the received service request comprises:
means for using a public key infrastructure (PKI) and the information contained in the SSL_CLIENT_S_DN_CN field in the client certificate to identify the UE device; and
means for communicating with a provisioning server to determine whether the UE device is currently authorized to access the configuration file and receive the service requested in the service request.

34. The server computing device of claim 31, further comprising means for establishing a transport layer security connection with the UE device by:
sending a server certificate to the UE device;
verifying an authenticity of the client certificate; and
determining whether that the UE device belongs to a group of approved devices that are each authorized to connect to a service provider network and communicate with the server computing device.

35. The server computing device of claim 31, wherein means for receiving the received service request and the client certificate that includes the information in the SSL_CLIENT_S_DN_CN field comprises means for receiving a signed client certificate that is signed by a root certificate authority component associated with a manufacturer of the UE device.

36. The server computing device of claim 31, wherein means for receiving the service request and the client certificate that includes the information in the SSL_CLIENT_S_DN_CN field comprises means for receiving an HTTP GET message that includes the client certificate and a $file variable.

37. The server computing device of claim 36, wherein means for determining, based on the information in the SSL_CLIENT_S_DN_CN field in the client certificate, whether the UE device is authorized to access the configuration file and receive the service requested in the received service request comprises:
means for verifying an authenticity of the client certificate;
means for verifying that the UE device belongs to a group of approved devices that are authorized to connect to an associated service provider network;
means for sending an System Access Device Get All Request command/call to extended services platform (XSP) component in response to verifying the authenticity of the client certificate and verifying that the UE device belongs to the group of approved devices;
means for receiving an System Access Device Get All Response from the XSP;
means for parsing the System Access Device Get All Response for variables $spid, $gid, $device, and $deviceType;
means for sending an System Access Device File Get List Request command to the XSP in response to receiving and parsing the System Access Device Get All Response;
means for receiving an System Access Device File Get List Response message from the XSP in response to sending the System Access Device File Get List Request command to the XSP, the System Access Device File Get List Response message including a list of configuration files the UE device is allowed to access; and
means for determining whether the $file variable is included in the list of configuration files.

38. The server computing device of claim 37, further comprising:
means for sending an HTTPS GET $Repository_URL message to a provisioning server, receiving HTTPS XML file that includes a content of the configuration file associated with the $file variable, and sending the HTTPS XML file to the UE device in response to determining that the $file variable is included in the list of configuration files.

39. The server computing device of claim 37, further comprising:
means for sending an SIP Device Type File Get List Request to a provisioning server, receiving an SIP Device Type File Get List Response from the provisioning server, and determining whether the $file variable is included in the SIP Device Type File Get List Response in response to determining that the $file variable is not included in the list of configuration files.

40. The server computing device of claim 39, further comprising:

means for sending an HTTPS GET $Repository_URL message to the provisioning server, receiving an HTTPS XML file that includes a content of the configuration file associated with the $file variable, and sending the HTTPS XML file to the UE device in response to determining that the $file variable is included in the SIP Device Type File Get List Response; and means for sending an HTTPS ERROR message to the UE device in response to determining that the $file variable is not included in the SIP Device Type File Get List Response.

* * * * *